T. M. HARBERT.
WEED FOLDING ATTACHMENT FOR PLOWS.
No. 195,760. Patented Oct. 2, 1877.
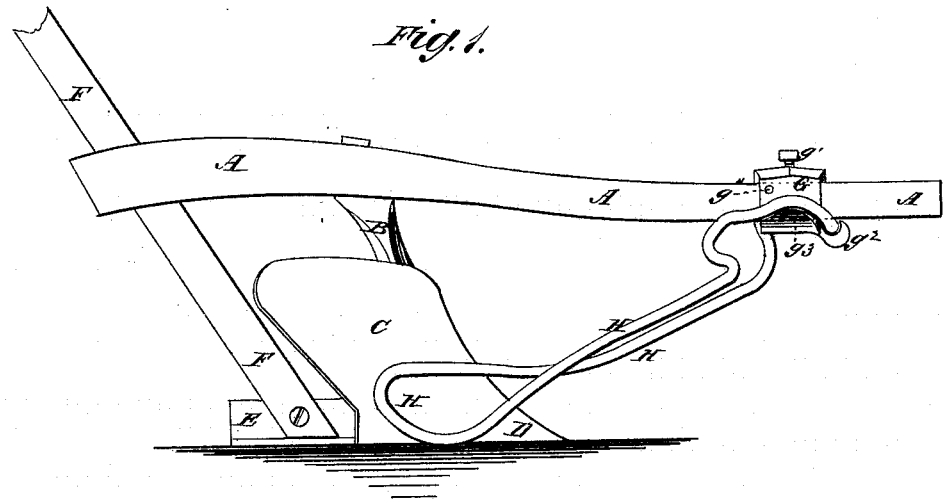
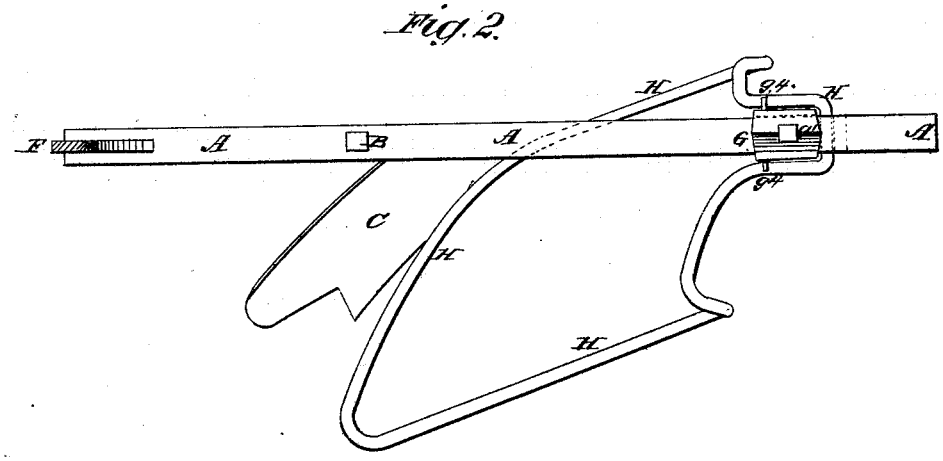
WITNESSES:
INVENTOR:
T. M. Harbert.
BY
ATTORNEYS.

UNITED STATES PATENT OFFICE.

THOMAS M. HARBERT, OF BURLINGTON, KANSAS.

IMPROVEMENT IN WEED-FOLDING ATTACHMENTS FOR PLOWS.

Specification forming part of Letters Patent No. 195,760, dated October 2, 1877; application filed July 23, 1877.

*To all whom it may concern:*

Be it known that I, THOMAS M. HARBERT, of Burlington, in the county of Coffey and State of Kansas, have invented a new and useful Improvement in Weed-Folding Attachment for Plows, of which the following is a specification:

Figure 1 is a side view of a plow to which my improved attachment has been applied. Fig. 2 is a top view of the same.

Similar letters of reference indicate corresponding parts.

The object of this invention is to furnish an improved attachment for plows, which shall be so constructed as to bend down weeds, grass, corn-stalks, &c., and fold them into the preceding furrow, so that they will be fully covered by the furrow-slice, and which shall be simple in construction, easily applied to the plow, and effective in operation.

The invention consists in the rod or bar formed into bends, curves, and inclines, as herein shown and described, to adapt it to be attached to a plow-beam for dividing, guiding, and folding down grass, weeds, &c., into the furrow, as hereinafter set forth.

A represents the beam, B the standard, C the mold-board, D the point, E the land-side, and F the land-side handle, of a plow, about the construction of which parts there is nothing new.

G is a cast-iron collar, the cavity of which is made of such size and shape as to fit upon the forward part of the plow-beam A, where it is secured in place adjustably and detachably by the set-screw $g^1$, which passes down through its upper part, and bears against the upper side of the beam A. Upon the forward edge of its lower part is formed a hook, $g^2$, to serve as a hinge for the folder. Upon the lower part of the sides of the collar G are formed rest flanges or shoulders $g^3$ for the folder to rest upon, and upon the rear upper parts of said sides are formed stop-pins or projections $g^4$, to limit the upward movement of said folder. H is the folder, which is made of a rod or bar of round or square iron, and the forward part of which is so formed as to fit into the cavity of the hinge-hook $g^2$, and is then bent back upon both sides of the plow-beam to fit and rest upon the rest flanges or shoulders of the collar G. Upon the land-side side of the plow-beam the fender is bent outward, and then downward to divide the grass, weeds, &c., and extends back with a downward inclination nearly to the point of the plow, where it is bent obliquely toward the plowed land, so as to be nearly parallel with the mold-board, to cause it to bend down the grass, weeds, &c., upon the furrow-slice. At or a little beyond the outer edge of the furrow-slice the folder is curved downward with a slight inward bend, so as to twist or fold down the grass or weeds, &c., into the furrow.

From the folding curve the folder passes forward with an upward inclination, and is then bent upward, and curved inward and forward to the shoulder of the collar G, so as to guide tall grass and weeds back to the folding curve, so that they will be folded down into the furrow.

Having thus described my invention, I claim as new and desire to secure by Letters Patent—

The rod or bar H formed into bends, curves, and inclines, substantially as herein shown and described, to adapt it to be attached to a plow-beam for dividing, guiding, and folding down grass, weeds, &c., into the furrow, as set forth.

THOMAS MOSES HARBERT.

Witnesses:
S. J. CARTER,
P. K. WADHAMS.